United States Patent [19]

Choi

[11] 4,239,599
[45] Dec. 16, 1980

[54] PROCESS FOR STRIPPING OIL FROM FLUIDIZED ASH AND CHAR PARTICLES TO PREPARE THE PARTICLES FOR DECARBONIZATION

[75] Inventor: Charles K. Choi, Claremont, Calif.

[73] Assignee: Occidental Petroleum Corporation, Los Angeles, Calif.

[21] Appl. No.: 936,098

[22] Filed: Aug. 23, 1978

Related U.S. Application Data

[60] Division of Ser. No. 719,274, Aug. 31, 1976, Pat. No. 4,116,823, which is a continuation-in-part of Ser. No. 603,874, Aug. 11, 1975, abandoned.

[51] Int. Cl.$^3$ .................... C10B 49/16; C10B 53/02; B09B 3/00
[52] U.S. Cl. .................... 201/2.5; 201/12; 201/21; 201/25; 201/28; 208/150
[58] Field of Search .................... 201/3, 31, 42, 2.5, 201/12, 21, 25, 28, 33; 209/44; 208/150, 8 R, 11 R

[56] References Cited

U.S. PATENT DOCUMENTS 4,147,593  4/1979  Frischmuth et al. .............. 201/12 X

*Primary Examiner*—Joseph Scovronek
*Attorney, Agent, or Firm*—Christie, Parker & Hale

[57] ABSTRACT

A mixture of a high density particulate inorganic heat source and a low density particulate carbon containing residue formed in the pyrolysis of a solid waste is passed along with some entrained pyrolytic oil to a fluidized bed of particles, where a gas is injected to strip the entrained pyrolytic oil from the particles, and a mixture of a high density particulate heat source and low density particulate carbon containing solid residue of pyrolysis are separated from an intermediate point of the fluidized bed and passed to a decarbonization zone, where the carbon containing solid residue of pyrolysis is decarbonized to form a high density particulate inorganic solid heat source for use as the source of heat in the pyrolysis of organic solid waste.

1 Claim, 2 Drawing Figures

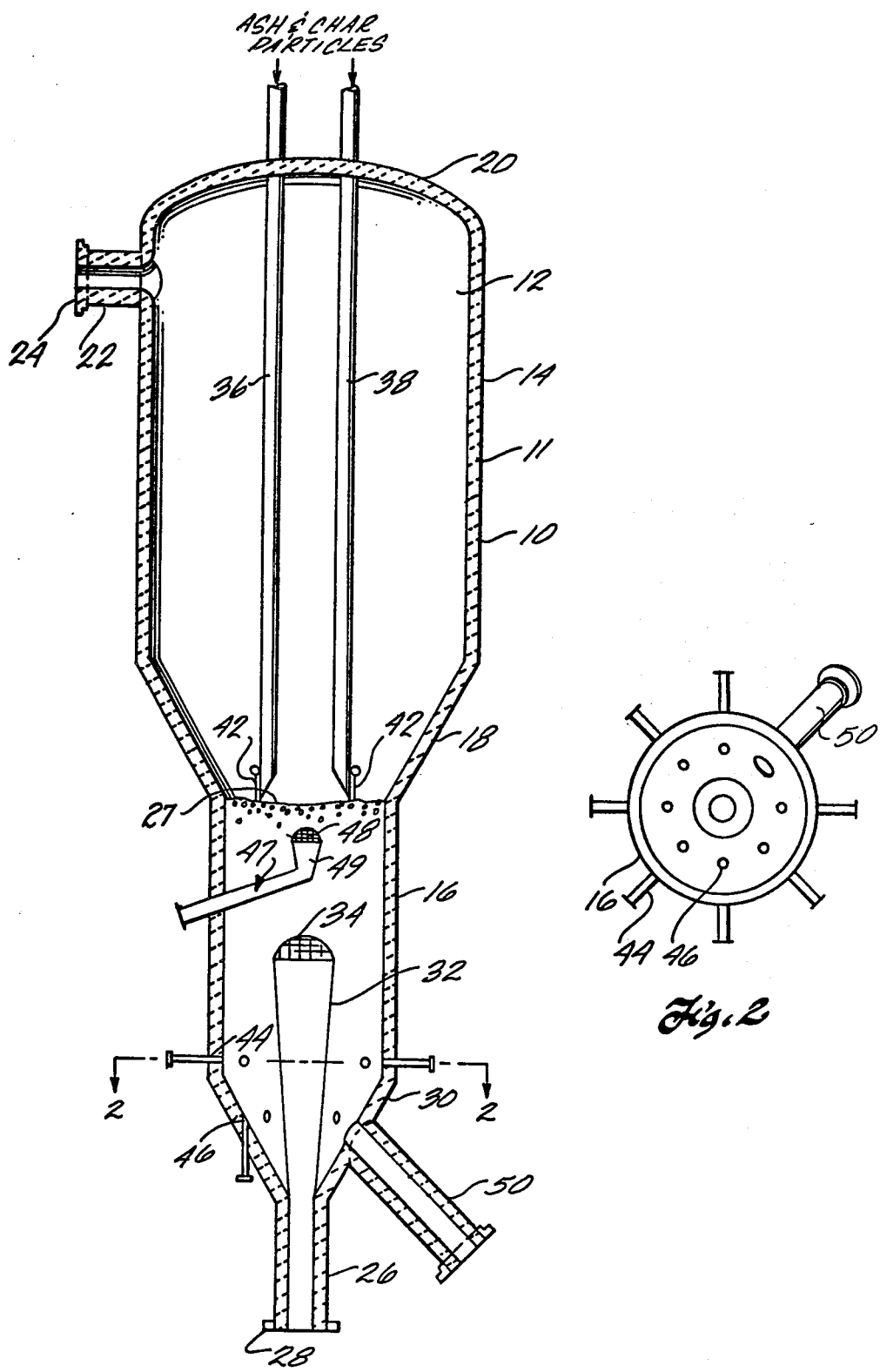

4,239,599

PROCESS FOR STRIPPING OIL FROM FLUIDIZED ASH AND CHAR PARTICLES TO PREPARE THE PARTICLES FOR DECARBONIZATION

CROSS REFERENCE TO RELATED APPLICATION

This is a division of application Ser. No. 719,274 filed Aug. 31, 1976, now U.S. Pat. No. 4,116,823 which is a continuation-in-part of my application Ser. No. 603,874, filed Aug. 11, 1975 now abandoned.

FIELD OF THE INVENTION

This invention relates to apparatus for use in a flash pyrolysis system for disposing of solid waste, and more particularly, is concerned with a vessel for stripping oil from and fluidizing particulate inorganic heat source and particulate carbon containing solid residue of pyrolysis recovered from the pyrolysis of organic solid waste. This vessel also serves as a surge vessel for the mixture particles before they are transferred to a burner. The surge capacity is a very important function to provide smooth circulation of solids.

BACKGROUND OF THE INVENTION

The disposal of waste both from municipal and industrial sources, such as trash, rubbish, garbage, animal wastes, agricultural wastes, and waste of platic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill, are becoming impossible, while others such as incineration are costly and result in air pollution problems.

A vast majority of the waste which is presently disposed of contains products which are immediately recyclable back into the economy or products into which the waste can be converted for recycle back to the economy. Directly recyclable constituents are the various metals present, such as aluminum and steel, and glass. For the most part, the organic solid waste fraction is subjected to flash pyrolysis as an operation independent of recovery of the directly recyclable inorganic fraction and any organic portion recovered as pulp. Flash pyrolysis in the presence of an inorganic heat source or ash yields carbon containing solid residue or char, condensible pyrolytic oils and combustible gases. The solid particles are removed from the liquid and gas constituents mechanically by cyclone separators. The oil and gas are valuable by-products, part of the gas being recycled to provide energy to the system.

After separation, it is necessary to fluidize the solid particles by mixing them with recycled product gas and direct them into a combustion chamber where the particles are mixed with a source of oxygen, typically air and cause decarbonization of the carbon containing solid residue of pyrolysis to reheat the inorganic heat source and generate from the carbon containing solid residue of pyrolysis additional inorganic heat source. However, before the particles can be fluidized, they must be stripped of any residual oil which tends to make the particles stick together and also to recover the oil before combustion takes place.

SUMMARY OF THE INVENTION

The present invention is directed to a vessel which receives particles of different density from cyclone separators, fluidizes the particles with gas, strips the particles of any residual oil, and passes on particles in the desired size and proportion of the particles of different density.

This is achieved, in brief, by providing a vessel having an elongated vertical chamber with conduit means for directing a mixture of particles downwardly into the chamber and releasing them into the chamber at an intermediate level at approximately the level of a fluidized bed of the particles in the chamber. A gas is directed into a lower smaller diameter end of the chamber through a plurality of vertically directed jets of gas and a plurality of horizontally directed jets which agitate and fluidize the particles as they accumulate at the bottom of the chamber. A standpipe, preferably covered with a screen mesh, removes the fluidized gas particles at an intermediate level at which the proportion of the particles of different density is in the desired range. An outlet is also provided at the top of the chamber for removing gas and any extremely fine particles which escapes the fluidized bed for recirculation through the cyclone separators.

Applied to the pyrolysis of solid waste, the apparatus serves a significant function in providing particles of different density and character to a decarbonization zone. In the process, particulate organic solid waste is pyrolyzed in the presence of a hot solid inorganic heat source transported with the waste through a flash pyrolysis zone by a carrier gas which is nondeleteriously reactive with respect to the products of pyrolysis. Pyrolysis yields a low density carbon containing solid residue of pyrolysis, pyrolytic oils and gases. These combined with the higher density particles of inorganic solid heat source pass through one or more cyclone separators which remove the particles of different density of the vapor stream. Some pyrolytic oils are entrained by the particles.

The particles are conducted to a fluidized bed of the particles contained in a vessel which provides a gas expansion zone above the fluidized bed. Jets of gas are injected into the base of the bed to fluidize the particles and strip entrained oil from the surface of the particles. Agitation prevents segregation of the low density particles of carbon containing solid residue of pyrolysis of the particulate inorganic solid heat source. The desired mixture of the two particles are withdrawn from a point central of the fluidized bed and passed to a decarbonization zone. In the decarbonization zone, the carbon containing solid residue of pyrolysis is oxidized to heat the inorganic solid heat source and form from decarbonization additional inorganic solid heat source for recycle to the flash pyrolysis zone.

DESCRIPTION OF THE DRAWINGS

For a more complete understanding of the invention, reference should be made to the accompanying drawing, wherein:

FIG. 1 is an elevational view in section of the vessel; and

FIG. 2 is a cross-sectional view taken along the line 2—2 of FIG. 1.

DETAILED DESCRIPTION

Stripper vessels provided in accordance with this invention find particular utility in the pyrolysis of solid organic waste. Pyrolysis occurs in a transport flash pyrolysis reactor.

The organic solid wastes which undergoes pyrolysis is the predominately organic portion remaining after gross separation of the inorganic constituents from the as received waste. Because of the several comminuting operations attendant to the gross separation, there appear in the organic solid waste fraction some inorganic solid fines. The fines are predominately glass. These inorganics, except for lost or removed fly ash, become a particulate solid heat source or "ash" formed upon decarbonization of the carbon containing solid residue of pyrolysis as described below.

The "organic" constituents of the organic solid wastes include cellulosic materials, plastic, rubber stock, and animal waste. Included in the meaning of "cellulosic materials" are paper, tree trimmings and bark, sawdust, crop waste, vegetable and fruit processing waste, and the like. "Plastics" include discarded household plastics, as well as the waste of industrial polymer forming and processing operations. "Rubber stock" includes waste tires. "Animal wastes" include household discards, slaughterhouse wastes, poultry processing wastes, manure, and the like.

The organic solid waste may have, after drying to the extent required preparatory to a pyrolysis, the following typical analysis:

TABLE 1

| Constitutent | % by Weight |
| --- | --- |
| Organics | 92.29 |
| Metals | 0.38 |
| Glass | 1.69 |
| Other Inorganics | 2.02 |
| Water | 3.62 |

When the organic solid waste is pyrolyzed, there is formed a mixture of a carbon containing solid residue of pyrolysis, termed herein "char", pyrolytic oils and gas. The gas includes transport gas and gases resulting from pyrolysis. The gas on a dry basis consists primarily of the oxides of carbon, hydrogen and light hydrocarbons.

The carbon containing solid residue of pyrolysis, or "char", contains combustibles which are carbonaceous in nature, the main constituent of which is carbon, in intimate admixture with particulate inorganics. The carbon containing solid residue of pyrolysis, depending on the waste source, may contain from about 50 to about 70% inorganics, the balance being carbonaceous in nature, i.e. mainly carbon with some bound hydrogen, and oxygen being present. Bulk density of the char is low, ranging from about 5.5 to 12.5 lbs./cu. ft.

The inorganic solid heat source or "ash" which is formed by decarbonization of the char and in contrast to the char, has a high bulk density between about 55 and 70 lbs./cu. ft. Its hard, glass like nature makes an ideal particulate heat source which is readily generated from within the process itself. The ash has a sintering temperature between about 1400° and about 1700° F. and a particle and skeletal density of about 150 lbs./cu. ft. When used as a heat source a major quantity of "fly ash" is removed.

The "pyrolytic oils" formed while varying in nature depending upon the composition of the waste material processed and pyrolysis conditions employed are at the same time unique. They may be characterized as an oxygenated, complex organic fluid, typically up to 40% and in some cases up to about 90% soluble in water, acids or base. A typical example of an elemental analysis of the pyrolytic oil is that obtained from the pyrolysis of a waste material containing about 70% cellulosics. The oil thus obtained will contain from about 40 to about 60% carbon, from about 5 to about 10% hydrogen, from about 1 to about 2% nitrogen and from about 20 to about 40% oxygen. The empirical formula which best fits the pyrolytic oil analysis is $C_5H_8O_2$. Specific gravities range from about 1.1 to about 1.4.

A nondeleteriously reactive carrier gas is a gas stream which is essentially free of free oxygen. Although constituents may react under nonoxidizing conditions with pyrolysis products to upgrade their value, to be avoided are constituents which degrade pyrolysis products.

As indicated, flash pyrolysis yields the carbon containing solid residue of pyrolysis in admixture with the inorganic heat source, pyrolytic oils and gases. The mixture passes through one or more cyclone separators when the particles are separated, with some entrained oils from the vapor stream.

It is necessary to proper operation of the system to collect these particles to different density, strip oil from their surface and transfer them to a decarbonization zone. In the decarbonization zone, the carbon containing solid residue of pyrolysis is decarbonized in the presence of a source of oxygen, typically air. The heat released is used to heat the inorganic solid heat source particles back to a temperature suitable for introduction to the pyrolysis zone. Decarbonization yields additional particles of the inorganic heat source.

It is essential that the carbon containing solid residue of pyrolysis and inorganic solid heat source be provided to the decarbonization zone in proper proportions. This is to provide enough carbon to heat the solids upon decarbonization; avoid excess heat through an over supply of carbon containing solid residue which can produce too much heat and sinter the inorganic solid heat source particle and produce a deficiency of the carbon containing solid residue causing resort to an external fuel to generate the heat required.

It is to achieve this balance of feed to the decarbonization zone that the apparatus of this invention is provided. In addition, the apparatus must serve to strip particles of entrained oil to insure free flowing transfer to the decarbonization zone.

Referring now to the drawings in detail, the numeral 10 indicates generally the outer wall of the housing which is made of metal pipe and lined with a layer of refractory material 11. The vessel includes an upper cylindrical portion 14 and a lower cylindrical portion 16 of smaller cross-sectional area joined by a frustoconical section 18. The upper end is enclosed by a dome-shaped top 20. An outlet pipe 22 terminating in a coupling flange 24 extends out from the upper end of the upper cylindrical portion 14. The lower end of the vessel terminates in an outlet pipe 26 having a coupling flange 28, the lower outlet pipe extending downwardly along the central axis of the vessel. A lower frustoconical section 30 extends between the lower cylindrical portion 16 and the outlet pipe 26.

Positioned in the lower end of the vessel is a particles outlet conduit such as standpipe 32 which is slightly tapered from the lower end to engage the ceramic lining at the upper end of the outlet pipe 26. The upper end of the standpipe 32 terminates in a screen 34 having a mesh size which excludes particles that are too large to be fluidized effectively.

To introduce the particles into the vessel, one or more particles inlet conduit, such as indicated at 36 and 38, are provided. These conduits extend downwardly through the top 20 of the vessel 10 and terminate adjacent the upper end of the lower section 16 of the vessel to provide a point of discharge. These conduits are normally adapted to form the diplegs from a pair of cyclone separators (not shown) mounted above the vessel. The lower end of the pipes are provided with means such as flap valves 40 and 42 which are opened by the weight of particles accumulating in the pipes but which are closed by any back pressure tending to reverse the downward flow of the particles and gas into the conduit so as to disturb operation of the cyclones.

Aeration of the particles in the vessel is accomplished by two groups of nozzles providing jets of gas. One group includes a plurality of horizontal nozzles 44 which extend through the lower section 16 of the vessel. Typically eight such nozzles are angularly spaced around the inner periphery of the vessel wall. A second group of nozzles, indicated at 46, extend vertically into the vessel through the lower frustoconical section 30. A plurality of such nozzles 46 are angularly spaced around the inner periphery of the vessel wall. Both the horizontal set of nozzles 44 and the vertical set of nozzles 46 are connected to a high pressure source of a gas which is nondeleteriously reactive with respect to the contained particles, preferably recycled product gas from the solid waste disposal system. The gas jets produce sufficient velocity in the lower end of the vessel to suspend particles and maintain them in a fluidized state. As the gas moves upwardly into the larger diameter upper section 12 of the vessel, the velocity of the gas is greatly reduced so as to minimize entrainment of the particles in the gas as it leaves the vessel through the outlet pipe 22. By a suitable valve means (not shown) in the outlet line coupled to the lower outlet pipe 26, the level of the particles in the vessel is maintained level 27 with the top of the lower section 16.

As the gas passes upwardly through the particle bed in the lower end of the chamber, the gas by reason of its elevated temperature (500° F.) purges any residual oil from the particles. The gas, oil, and some of the very fine particles pass out through the outlet 22. These can be recycled for separation and recovery of the particles to enable their return to the vessel.

The standpipe 32 is arranged to terminate at its upper end at an intermediate level in the particle bed within the lower section 16. Because the inorganic heat source or "ash" particles are of higher density than the particles of carbon containing solid residue of pyrolysis or "char", they tend to concentrate in the lower portion of the bed while the lower density char particles tend to concentrate near the upper level of the bed. By locating the top of the standpipe at an intermediate level, the desired mixture of ash and char particles is syphoned off from the vessel for feed to a decarbonization zone (not shown). The shorter the height of the standpipe, the greater percentage of ash particles in the output stream, whereas the longer the standpipe, the greater the percentage of char particles in the output mix.

In some instances, if the density or ratio of char to ash is lower than usual, the concentration of char entering the standpipe 32 may be too low. An auxiliary outlet 47 is provided for this purpose. The outlet 47 includes a screen 48 and an outlet pipe 49 which extends through the cylindrical portion 16. The pipe angles downwardly to aid in movement of the char particles from the vessel.

A separate outlet pipe may be provided, as indicated at 50, in the lower end of the vessel for purging the vessel of any large particles of solid material that may in time collect in the bottom of the vessel. A valve (not shown) is connected to the outlet 50 which is normally closed.

What is claimed is:

1. In a process for the pyrolysis of organic solid waste wherein a high density particulate inorganic heat source is combined with particulate organic solid waste and transported through a flash pyrolysis zone which yields from pyrolysis of the particulate organic solid waste, a low density particulate carbon containing solid residue of pyrolysis, pyrolytic oils and gases, which in admixture with the high density particulate inorganic heat source pass through at least one cyclone separator which separates particles of the high density particulate heat source and low density particulate carbon containing solid residue of pyrolysis with some entrained pyrolytic oil from the balance of the pyrolytic oils and gases, the steps of preparing separated particles of high density particulate heat source and low density particulate carbon containing solid residue of pyrolysis for feed to a decarbonization zone where the high density particulate inorganic heat source is heated and the low density particulate carbon containing solid residue of pyrolysis converted to high density particulate inorganic heat source which comprises:

(a) transferring the separated particles of high density particulate inorganic solid heat source and low density particulate carbon containing solid residue of pyrolysis to a fluidized bed of particles of high density particulate inorganic solid heat source and low density particulate carbon containing solid residue of pyrolysis contained in a vessel having a gas expansion zone above the fluidized bed;

(b) injecting jets of a gas horizontally and vertically at the lower end of the fluidized bed to strip the pyrolytic oil from the particles and maintain the particles of the fluidized bed in a fluidized state;

(c) passing the gas and stripped oil from the fluidized bed through the gas expansion zone and outwards of the vessel;

(d) removing from a point intermediate of the fluidized bed a mixture of the high density particulate inorganic solid heat source and low density particulate carbon containing solid residue of pyrolysis for transfer to the decarbonization zone.

* * * * *

UNITED STATES PATENT AND TRADEMARK OFFICE
CERTIFICATE OF CORRECTION

PATENT NO. : 4,239,599

DATED : December 16, 1980

INVENTOR(S) : Charles K. Choi

It is certified that error appears in the above-identified patent and that said Letters Patent are hereby corrected as shown below:

Column 1, line 30, "platic" should be -- plastic --.
Column 2, line 28, "escapes" should be -- escape --. Column 4, line 26, "to" should be -- of --.

Signed and Sealed this

Twenty-eighth Day of December 1982

[SEAL]

Attest:

GERALD J. MOSSINGHOFF

Attesting Officer  Commissioner of Patents and Trademarks